US011725954B2

(12) United States Patent
Chan et al.

(10) Patent No.: US 11,725,954 B2
(45) Date of Patent: Aug. 15, 2023

(54) PRE-COMPUTING ROUTES FOR AUTONOMOUS VEHICLES USING MAP SHARDS

(71) Applicant: Waymo LLC, Mountain View, CA (US)

(72) Inventors: Andrew Chan, San Carlos, CA (US); Austin Abrams, Redwood City, CA (US); Joshua Herbach, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 195 days.

(21) Appl. No.: 16/987,893

(22) Filed: Aug. 7, 2020

(65) Prior Publication Data

US 2022/0042812 A1 Feb. 10, 2022

(51) Int. Cl.
*G01C 21/34* (2006.01)
*G08G 1/0968* (2006.01)
*G05D 1/02* (2020.01)

(52) U.S. Cl.
CPC ..... *G01C 21/3484* (2013.01); *G01C 21/3446* (2013.01); *G05D 1/0285* (2013.01); *G08G 1/096827* (2013.01)

(58) Field of Classification Search
CPC ............ G01C 21/3484; G01C 21/3446; G05D 1/0285; G08G 1/096827
See application file for complete search history.

(56) References Cited

U.S. PATENT DOCUMENTS

| 6,016,485 A * | 1/2000 | Amakawa .......... G01C 21/3446 |
| | | 705/400 |
| 8,630,958 B2 | 1/2014 | Carlsson et al. |
| 9,175,972 B2 | 11/2015 | Geisberger |
| 10,451,428 B2 | 10/2019 | Lathrop et al. |
| 11,222,299 B1 * | 1/2022 | Baalke ................. G06Q 10/087 |
| 2012/0310691 A1 * | 12/2012 | Carlsson ............. G06Q 10/047 |
| | | 705/7.13 |
| 2014/0163872 A1 * | 6/2014 | Schilling ................ G01C 21/32 |
| | | 701/527 |

(Continued)

OTHER PUBLICATIONS

Liu, Shaoshan, et al., Implementing a Cloud Platform for Autonomous Driving, 2017, pp. 1-8.

(Continued)

*Primary Examiner* — Jess Whittington
(74) *Attorney, Agent, or Firm* — Botos Churchill IP Law

(57) ABSTRACT

Aspects of the disclosure relate to pre-computing routes for autonomous vehicles using map shards. For example, a shard from a plurality of shards of a map may be selected. Each shard including a plurality of nodes and edges connecting pairs of nodes of the plurality of nodes, and each node of the plurality represents a location. A plurality of port nodes for the shard are identified. Each port node has an edge that enters into the selected shard or exists the selected shard. For each port node of the plurality having an edge that enters into the selected shard, optimal routes to each other port node of the plurality having an edge that exits the selected shard may be determined. The optimal routes for the selected shard may be sent to the autonomous vehicles in order to enable the autonomous vehicles to use the optimal routes to determine routes.

20 Claims, 15 Drawing Sheets

(56) References Cited

U.S. PATENT DOCUMENTS

| | | | |
|---|---|---|---|
| 2017/0219364 A1* | 8/2017 | Lathrop | G01C 21/36 |
| 2019/0056233 A1* | 2/2019 | Liu | G01C 21/3484 |
| 2019/0120640 A1* | 4/2019 | Ho | G01C 21/3461 |
| 2020/0064144 A1* | 2/2020 | Tomita | A01D 69/00 |
| 2022/0004942 A1* | 1/2022 | Gupta | G06Q 10/0832 |

OTHER PUBLICATIONS

Delling, et al., "Customizable Route Planning", Proceedings of the 10th International Symposium on Experimental Algorithms, 2011, 12 Pages, downloaded from https://www.microsoft.com/en-us/research/publication/customizable-route-planning/.

* cited by examiner

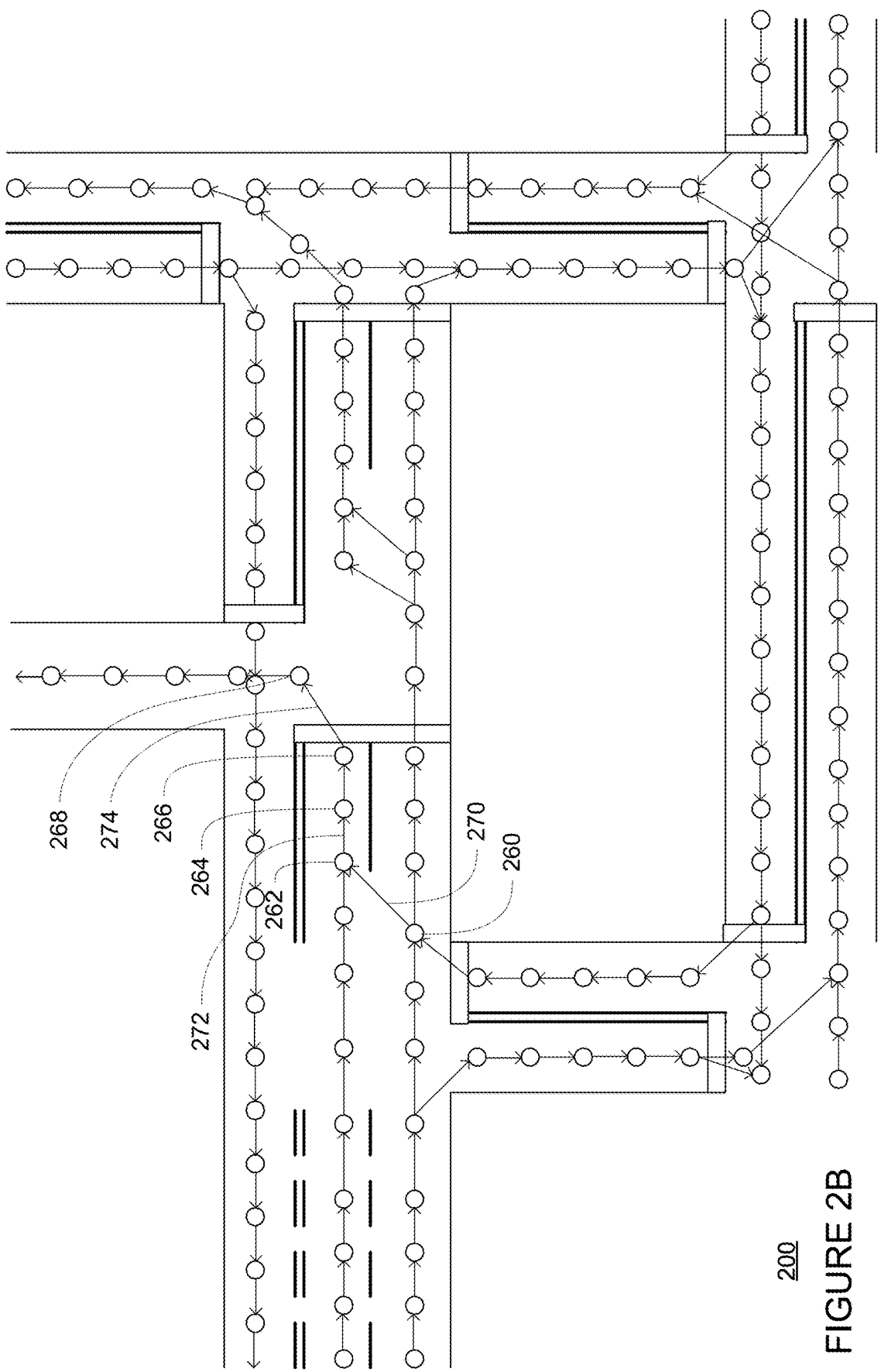

PRE-COMPUTING ROUTES FOR AUTONOMOUS VEHICLES USING MAP SHARDS

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. In order to do so, these autonomous vehicles may rely on highly-detailed map information. The map information used for routing these vehicles can be incredibly complex and therefore require a large amount of random-access memory (RAM) when being accessed. Thus, it may be impossible to retrieve all of the map information available or the entire map when routing between locations that are very far away from one another, such as in different states, etc.

BRIEF SUMMARY

Aspects of the disclosure provide a method of pre-computing routes for autonomous vehicles. The method includes selecting, by one or more processors of one or more server computing devices, a shard from a plurality of shards of a map, each shard including a plurality of nodes and edges connecting pairs of nodes of the plurality of nodes, wherein each node of the plurality of nodes represents a location; identifying, by the one or more processors, a plurality of port nodes for the selected shard, each port node having an edge that enters into the selected shard or exits the selected shard; for each port node of the plurality of port nodes having an edge that enters into the selected shard, determining, by the one or more processors, optimal routes to each other port node of the plurality of port nodes having an edge that exits the selected shard; and sending, by the one or more processors, the optimal routes for the selected shard to the autonomous vehicles in order to enable the autonomous vehicles to use the optimal routes to determine routes.

In one example, the method also includes determining a cost for each of the optimal routes and sending the costs to the autonomous vehicles in order to enable the autonomous vehicles to use the costs to determine routes. In another example, each node of the map appears in only one shard. In another example, the optimal routes are lowest cost routes for routing between the port nodes of the plurality having an edge that enters into the selected shard and the port nodes of the plurality having an edge that exits the selected shard. In this example, the method also includes updating the optimal routes as costs change, and sending the updated optimal routes to the autonomous vehicles in order to enable the autonomous vehicles to use the updated optimal routes to determine routes. In another example, each given port node of the plurality is associated with an identifier identifying a node of another shard of the plurality of shards to which given port node is connected by an edge that exits the selected shard and enters the another shard. In another example, the optimal routes are determined for a first type of vehicle and the optimal routes are sent with information identify the first type of vehicle, and the method further also includes, for each port node of the plurality having an edge that enters into the selected shard, determining, by one or more processors, second optimal routes to each other port node of the plurality having an edge that exits the selected shard, wherein the second optimal routes are determined for a second type of vehicle different from the first type of vehicle; and sending, by one or more processors, the second optimal routes with information identifying the second type of vehicle to the autonomous vehicles in order to enable the autonomous vehicles to use the second optimal routes to determine routes. In this example, the first type of vehicle must avoid certain maneuvers that the second type of vehicle need not avoid. In addition or alternatively, the first type of vehicle is a truck and the second type of vehicle is not a truck.

Another aspect of the disclosure provides a method for routing an autonomous vehicle. The method includes loading, by one or more processors of the vehicle, into memory a starting shard of a plurality of shards of a map based on a current location of the autonomous vehicle, each shard including a plurality of nodes and edges connecting pairs of nodes of the plurality of nodes, wherein each node of the plurality of nodes represents a location; loading, by the one or more processors, into memory a destination shard from the plurality of shards of a map based on a destination location for the autonomous vehicle; loading, by the one or more processors, into memory a plurality of pre-computed routes between port nodes of one or more shards adjacent to the starting shard and the destination shard, each port node having an edge that enters into the selected shard or exits the selected shard; determining, by the one or more processors, a route from the current location to the destination location using the starting shard, the destination shard, and the plurality of pre-computed routes; and controlling, by the one or more processors, the vehicle in an autonomous driving mode using the route.

In one example, determining the route does not cause the one or more adjacent shards to be loaded into the memory. In another example, each node of the map appears in only one shard. In another example, each of the plurality of pre-computing routes is associated with a cost for following the pre-computed route, and determining the route is further based on the costs of the plurality of pre-computed routes. In another example, determining the route using the plurality of pre-computed routes includes treating the pre-computed routes as individual edges between a pair of port nodes. In another example, each of the plurality of pre-computed routes is associated with a type of vehicle to which the route applies, and wherein the method includes selecting ones of the plurality of pre-computed routes associated with a type of the vehicle which is a same type of vehicle as the autonomous vehicle, and determining the route is based on the selected ones.

A further aspect of the disclosure provides a system for pre-computing routes for autonomous vehicles. The system comprising one or more processors configured to select a share from a plurality of shards of a map, each shard including a plurality of nodes and edges connecting pairs of nodes of the plurality of nodes, wherein each node of the plurality of nodes represents a location; identify a plurality of port nodes for the selected shard, each port node having an edge that enters into the selected shard or exits the selected shard; for each port node of the plurality of port nodes having an edge that enters into the selected shard, determine optimal routes to each other port node of the plurality having an edge that exits the selected shard; and send the optimal routes for the selected shard to the autonomous vehicles in order to enable the autonomous vehicles to use the optimal routes to determine routes.

In one example, the one or more processors are further configured to determine a cost for each of the optimal routes and send the costs to the autonomous vehicles in order to enable the autonomous vehicles to use the costs to determine routes. In another example, the optimal routes are lowest cost routes for routing between the port nodes of the plurality having an edge that enters into the selected shard and the port nodes of the plurality having an edge that exits the selected shard. In another example, each given port node of the plurality is associated with an identifier identifying a node of another shard of the plurality of shards to which given port node is connected by an edge that exits the selected shard and enters the another shard. In another example, the optimal routes are determined for a first type of vehicle and the optimal routes are sent with information identify the first type of vehicle, and the one or more processors are further configured to for each port node of the plurality having an edge that enters into the selected shard, determine second optimal routes to each other port node of the plurality having an edge that exits the selected shard, wherein the second optimal routes are determined for a second type of vehicle different from the first type of vehicle, and to send the second optimal routes with information identifying the second type of vehicle to the autonomous vehicles in order to enable the autonomous vehicles to use the second optimal routes to determine routes.

BRIEF DESCRIPTION OF THE DRAWINGS

FIGS. 2A-2B are an example of map information in accordance with aspects of the disclosure.

DETAILED DESCRIPTION

Overview

Figure 1:
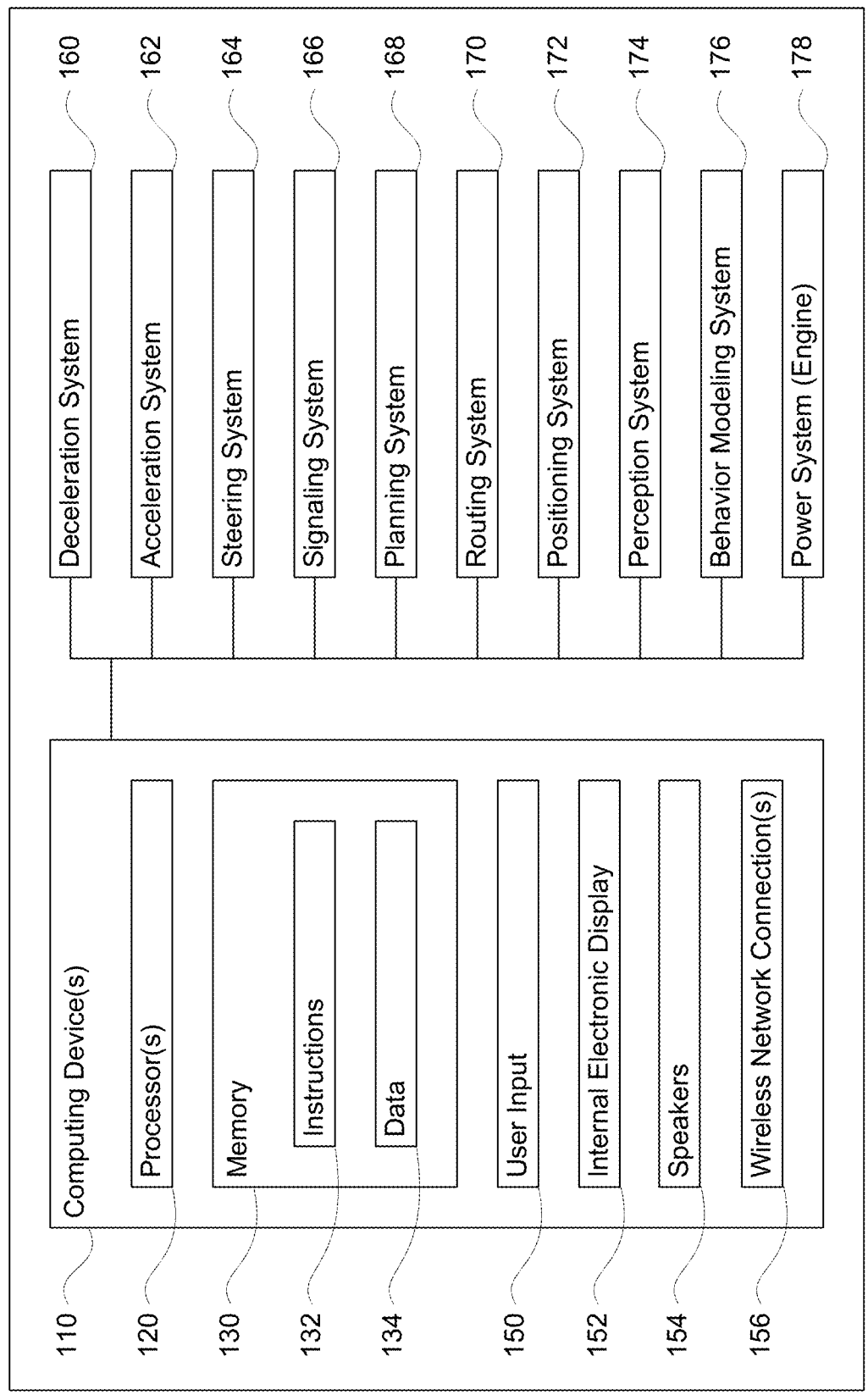
FIG. 1 is a functional diagram of an example vehicle in accordance with an exemplary embodiment.

The technology relates to pre-computing routes for autonomous vehicles using map shards. The map information used for routing these vehicles can be incredibly complex and therefore require a large amount of random-access memory (RAM) when being accessed. Thus, it may be impossible to retrieve all of the map information available or the entire map when routing between locations that are very far away from one another, such as in different states, etc. To avoid this, the map may be partitioned into smaller "map shards" (or simply, shards) which can be loaded and unloaded into the RAM of a vehicle as needed during operation of the vehicle. In addition, routes traversing the shards can be pre-computed in order to reduce processing times for determining routes that pass through a plurality of shards.

An autonomous vehicle may utilize the map information when determining a route for the vehicle to follow. For instance, the map may be configured as a roadgraph including a plurality of nodes representing locations in lanes which are connected by edges. As noted above, the map information may be partitioned into shards. Each shard may fit with one or more adjacent shards with overlapping edges. Nodes at the edges of each shard, or those which connect to an edge which leads out of or into a shard, may be referred to as "port" nodes. Each port node may include an identifier which identifies another node in another shard to which that node is connected in the map. By doing so, the shards may be aligned with one another relatively easily.

The vehicle's routing system may use the shards to determine a route from a current location (e.g. a location of a current node) to a destination. For example, the routing system may identify the shards of a current location and a destination location for a trip and pull these into RAM memory in order to generate a route. Each route may include a plurality of nodes and edges which the vehicle can use to reach the destination. Routes may be recomputed periodically as the vehicle travels to the destination.

However, computing long routes, such as those which may traverse three or more shards, may be computationally intensive. To address this, optimal routes across individual shards may be pre-computed. For instance, for a given shard, an optimal route between all port nodes with edges that enter the given shard and all other port nodes with edges that exit a given shard may be determined. The cost of that overall route as well as the optimal route itself may be associated with the shard. The shards as well as associated optimal routes and costs may be sent to the autonomous vehicles to be used for routing.

When routing, the routing system may load a starting shard (in which the current location of the vehicle is located) and a destination shard (in which the vehicle's destination is located) into RAM memory as well as the optimal routes and costs for nearby adjacent shards. The routing system may then perform typical routing searches in order to find a lowest cost route between the current location of the vehicle and the destination using the optimal routes rather than all of the nodes and edges along those optimal routes.

The features described herein may provide for a useful and practical approach to accessing and using map shards for routing. As noted above, the shards or only as needed optimal routes and costs can be loaded and unloaded dynamically during the vehicle's operation. Also, by pre-computing optimal routes and costs remotely from a vehicle, this may significantly reduce computational and memory resources needed for routing across two or more shards. In addition, by having smaller shards of the map information, this allows for systems which may require less resources, such as less RAM or processing power. This, in turn, may result in lower heat generation and lower coolant needs, lower weight for autonomous vehicle control system hardware and corresponding cooling systems, lower power draw which can result in longer battery life and possibly better fuel efficiency, and lower overall costs to build the vehicle (e.g. lower cost cooling and hardware systems). Moreover, the features described herein may be especially useful for vehicles, such as trucks, which may follow routes across vast distances and/or state lines.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone), various electronic displays (e.g., a monitor having a screen or any other electrical device that is operable to display information), and speakers 154 to provide information to a passenger of the vehicle 100 as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The autonomous control system 176 may include various computing devices, configured similarly to computing devices 110, capable of communicating with various components of the vehicle in order to control the vehicle in an autonomous driving mode. For example, returning to FIG. 1, the autonomous control system 176 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 134 of memory 130 in the autonomous driving mode.

As an example, a computing device of the autonomous control system 176 may interact with deceleration system 160 and acceleration system 162 in order to control the speed of the vehicle. Similarly, steering system 164 may be used by autonomous control system 176 in order to control the direction of vehicle 100. For example, if vehicle 100 is configured for use on a road, such as a car or truck, the steering system may include components to control the angle of wheels to turn the vehicle. The autonomous control system 176 may also use the signaling system in order to signal the vehicle's intent to other drivers or vehicles, for example, by lighting turn signals or brake lights when needed.

Routing system 166 may be used by the autonomous control system 176 in order to generate a route to a destination. Planning system 168 may be used by computing device 110 in order to follow the route. In this regard, the planning system 168 and/or routing system 166 may store detailed map information, e.g., highly detailed maps identifying a road network including the shape and elevation of roadways, lane lines, intersections, crosswalks, speed limits, traffic signals, buildings, signs, real time traffic information, pullover spots, vegetation, or other such objects and information.

Figure 2A:
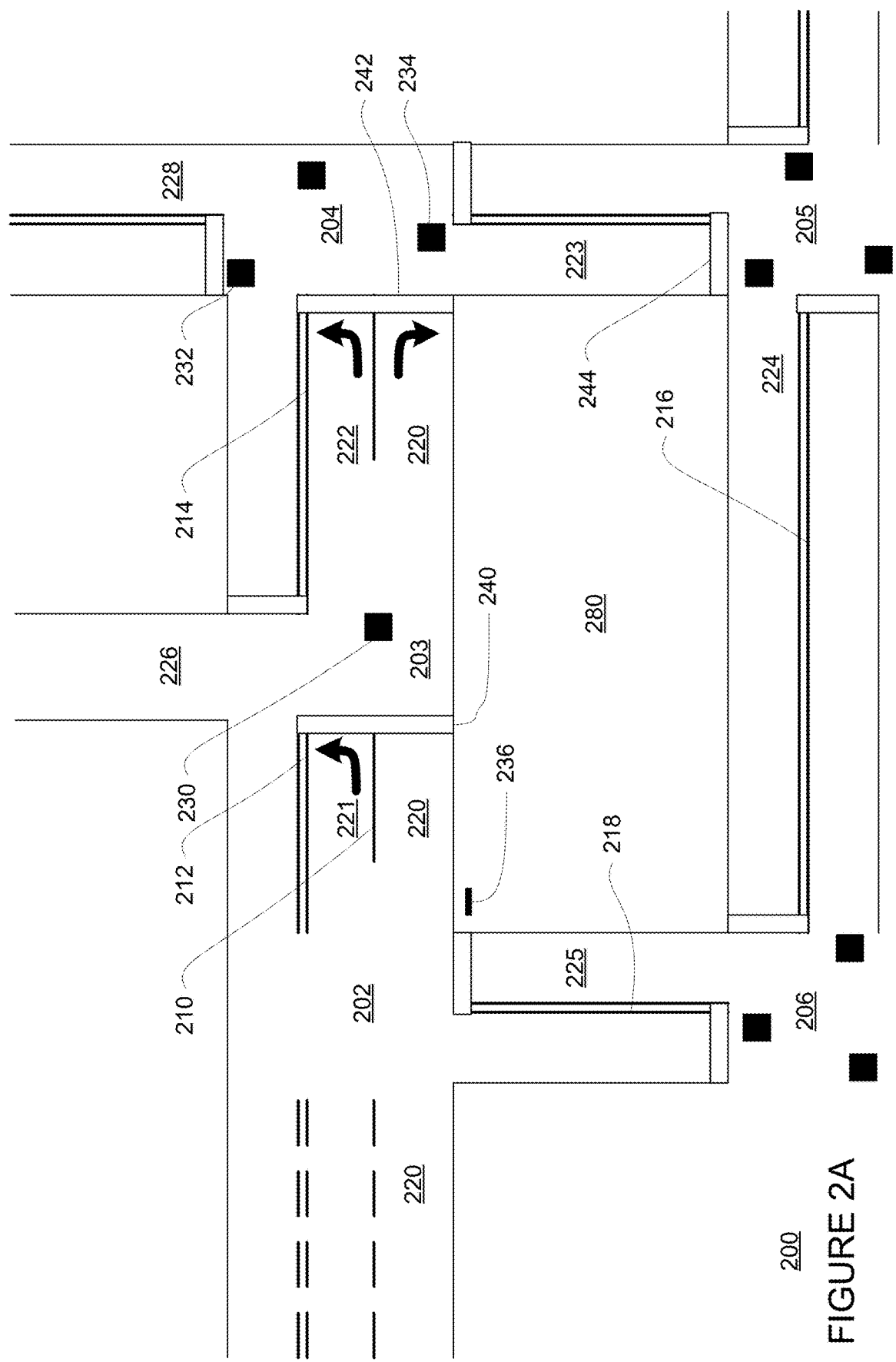

FIGS. 2A and 2B are an example of map information 200 for a small section of roadway including intersections 202, 203, 204, 205, 206. FIG. 2A depicts a portion of the map information 200 that includes information identifying the shape, location, and other characteristics of lane markers or lane lines 210, 212, 214, 216, 218, lanes 220, 221, 222, 223, 224, 225, 226, 228, traffic control devices including traffic signal lights 230, 232, 234 and stop sign 236 (not depicted in FIG. 2B for clarity), stop lines 240, 242, 244, as well as a non-drivable area 280. In this example, lane 221 approaching intersection 203 is a left turn only lane, lane 222 approaching intersection 204 is a left turn only lane, and lane 226 is a one-way street where the direction of traffic moves away from intersection 203. In addition to the aforementioned features, the map information may also include information that identifies the direction of traffic for each lane as well as information that allows the computing devices 110 to determine whether the vehicle has the right of way to complete a particular maneuver (i.e. complete a turn or cross a lane of traffic or intersection).

Although the map information is depicted herein as an image-based map, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a stop sign may be linked to a road and an intersection, etc. In some examples, the associated data may include grid-based indices of a road network to allow for efficient lookup of certain road network features.

In this regard, in addition to the aforementioned physical feature information, the map information may include a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

For instance, FIG. 2B depicts most of the map information of FIG. 2A with the addition of a plurality of edges represented by arrows and graph nodes (depicted as circles) corresponding to the road network of map information 200. Though many edges and graph nodes are depicted, only a few are referenced for clarity and simplicity. For example, FIG. 2B includes edges 270, 272, 274 arranged between pairs of starting and ending graph nodes as graph nodes 260, 262, 264, 266. As can be seen, graph nodes 260 represents a starting point for edge 270, and graph nodes 262 represents an ending point for edge 270. Similarly, graph node 262 represents a starting point for edge 272, and graph node 264 represents an ending point for edge 272. In addition, graph node 266 represents a starting point for edge 274, and graph node 268 represents an ending point for edge 274. Again, the direction of each of these graph nodes is represented by the arrow of the edge. Edge 270 may represent a path a vehicle can follow to change from lane 220 to lane 221, edge 272 may represent a path that a vehicle can follow within lane 221, and edge 274 may represent a path a vehicle can follow to make a left turn at intersection 203 in order to move from lane 221 to lane 226. Although not shown, each of these edges may be associated with an identifier, for instance, a numeric value corresponding to a relative or actual location of the edge or simply the locations of the starting and ending graph nodes. In this regard, edges and graph nodes may be used to determine how to route and plan routes and trajectories between locations, change lanes and make other maneuvers, though in operation, the vehicle 100 need not follow the nodes and edges exactly.

The routing system 166 may use the map information 200 to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by autonomous control system 176 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 170 may also include other devices in communication with the computing devices autonomous control system 176, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
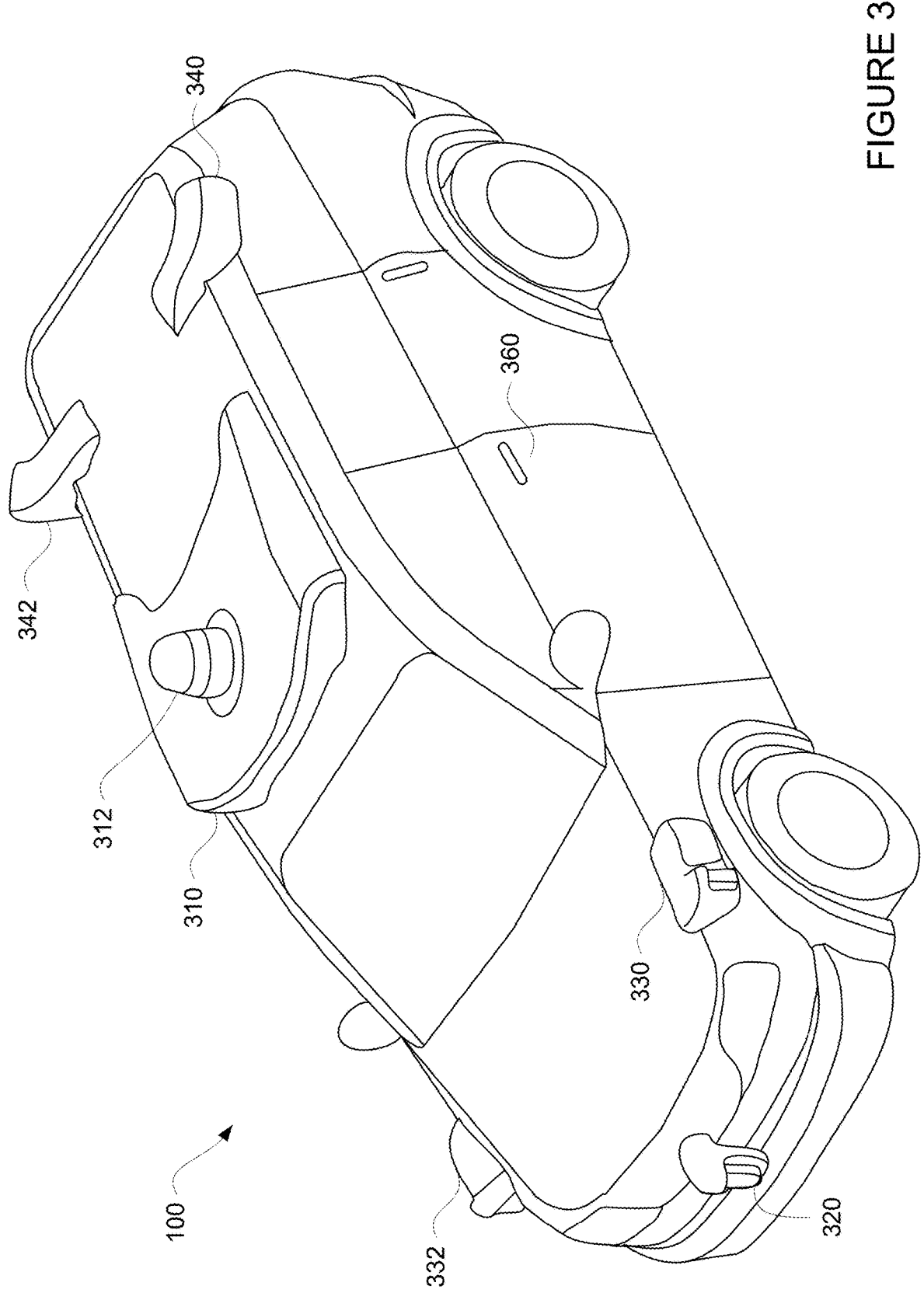
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the autonomous control system 176. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The autonomous control system 176 may be capable of communicating with various components of the vehicle in order to control the movement of vehicle 100 according to primary vehicle control code of memory of the autonomous control system 176. For example, returning to FIG. 1, the autonomous control system 176 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be input into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 166. In this regard, the trajectories may define the specific characteristics of acceleration, deceleration, speed, etc. to allow the vehicle to follow the route towards reaching a destination. A control system software module of the autonomous control system 176 may be configured to control movement of the vehicle, for instance by controlling braking, acceleration and steering of the vehicle, in order to follow a trajectory.

The autonomous control system 176 may control the vehicle in an autonomous driving mode by controlling various components. For instance, by way of example, the autonomous control system 176 may navigate the vehicle to a destination location completely autonomously using data from the detailed map information and planning system 168. The autonomous control system 176 may use the positioning system 170 to determine the vehicle's location and perception system 172 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, autonomous control system 176 may also control the drivetrain of the vehicle in order to maneuver the vehicle autonomously.

Figure 4:
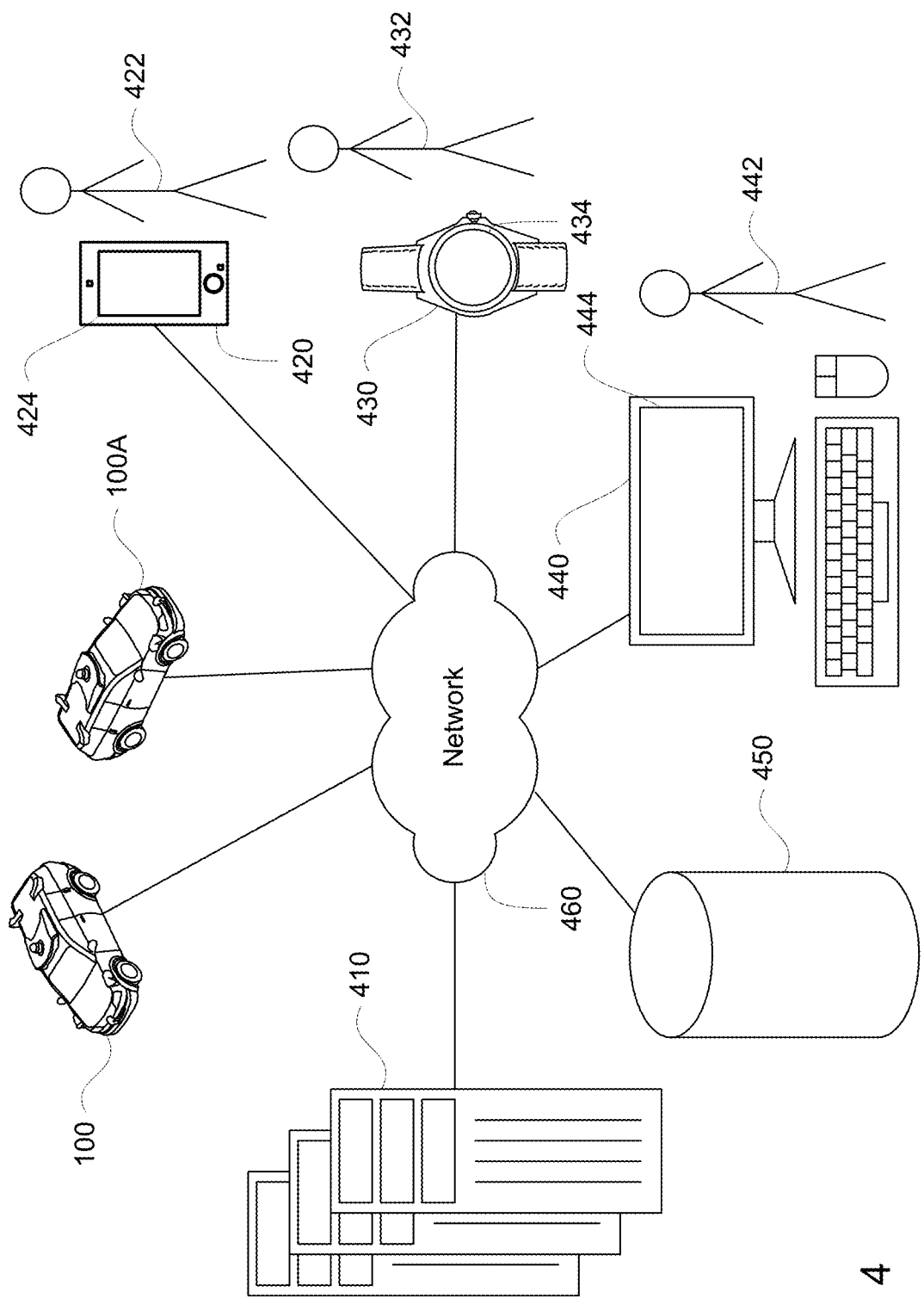
FIG. 4 is a pictorial diagram of an example system in accordance with aspects of the disclosure.
Figure 5:
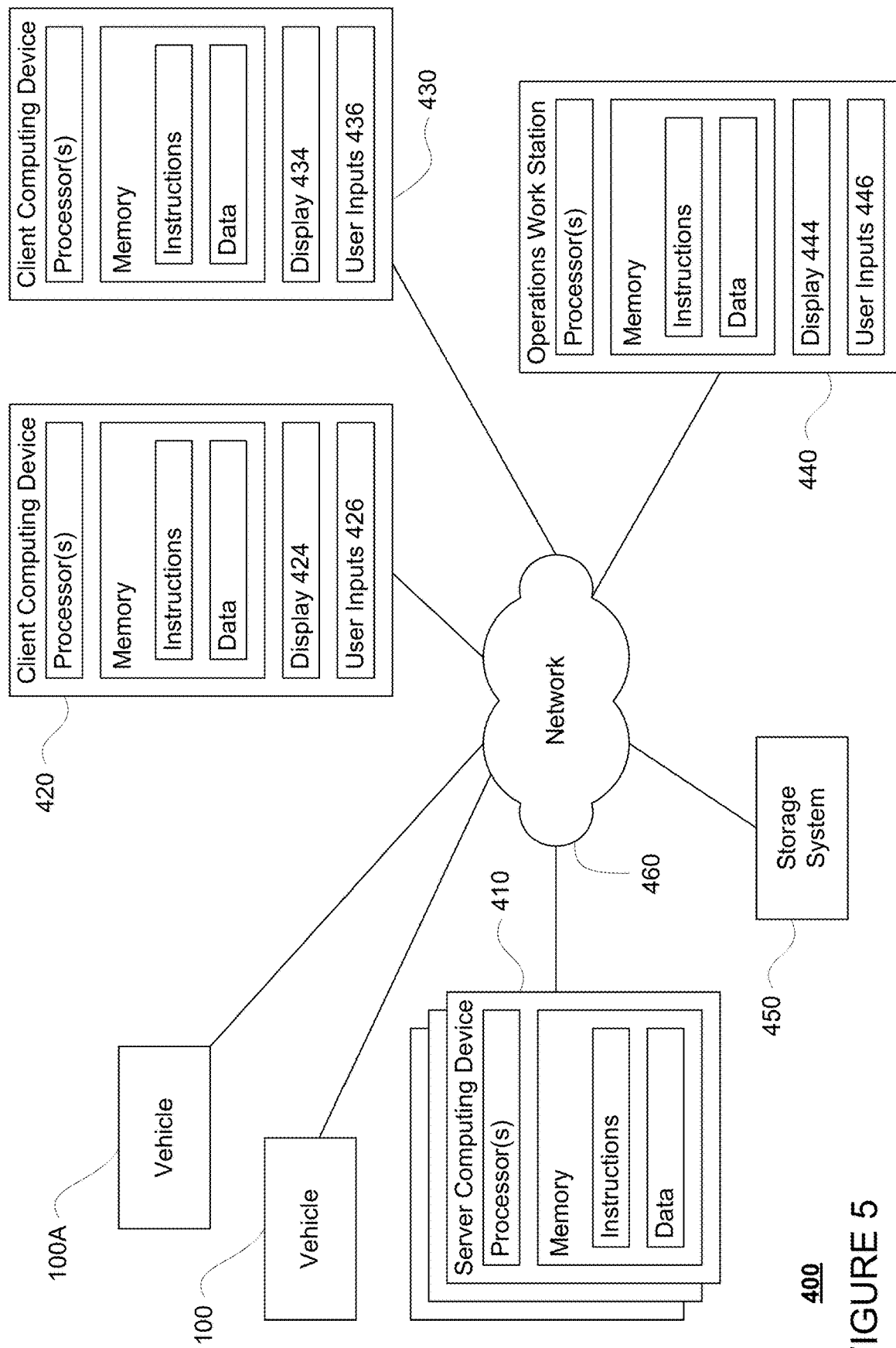
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100 and vehicle 100A, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system which can be used to dispatch vehicles such as vehicle 100 and vehicle 100A to different locations in order to pick up and drop off passengers. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 420 may be a mobile phone used by a passenger of a vehicle. In other words, user 422 may represent a passenger. In addition, client computing device 430 may represent a smart watch for a passenger of a vehicle. In other words, user 432 may represent a passenger. The client computing device 440 may represent a workstation for an operations person, for example, a remote assistance operator or someone who may provide remote assistance to a vehicle and/or a passenger. In other words, user 442 may represent a remote assistance operator. Although only a few passengers and operations persons are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, the storage system 450 may also store the aforementioned autonomous vehicle control software and systems which are to be used by vehicles, such as vehicle 100, to operate a vehicle in an autonomous driving mode. In addition, the storage system 450 may store the aforementioned map information, including map shards, optima routes and costs.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 13:
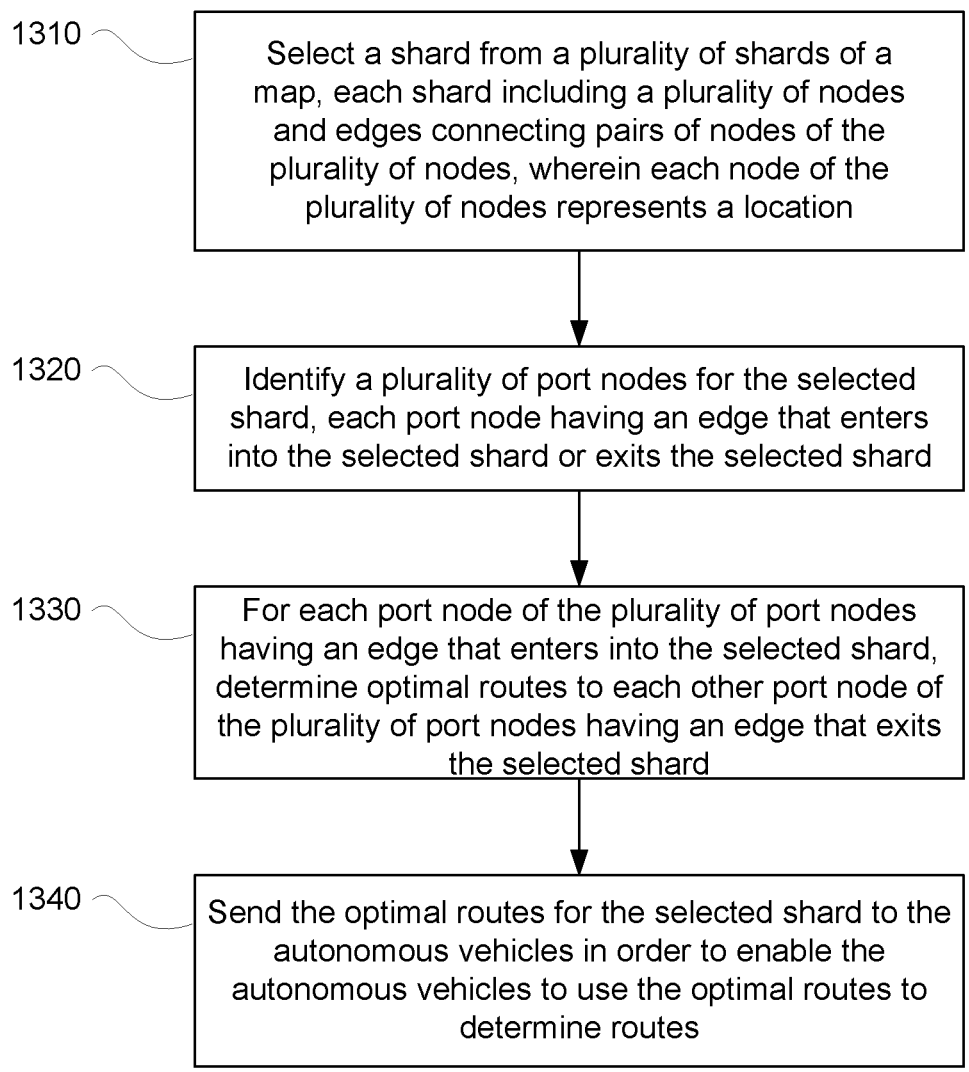
FIG. 13 is an example flow diagram in accordance with aspects of the disclosure.

As noted above, computing long routes, such as those which may traverse three or more shards, may be computationally intensive. To address this, optimal routes across individual shards may be pre-computed. FIG. 13 provides an example flow diagram 1300 for pre-computing routes for autonomous vehicles which may be performed by one or more processors of one or more computing devices such as the processors of server computing devices 410. At block 1310, a shard is selected from a plurality of shards of a map. Each shard includes a plurality of nodes and edges connecting pairs of nodes of the plurality of nodes, and each node of the plurality of nodes represents a location.

Figure 6:
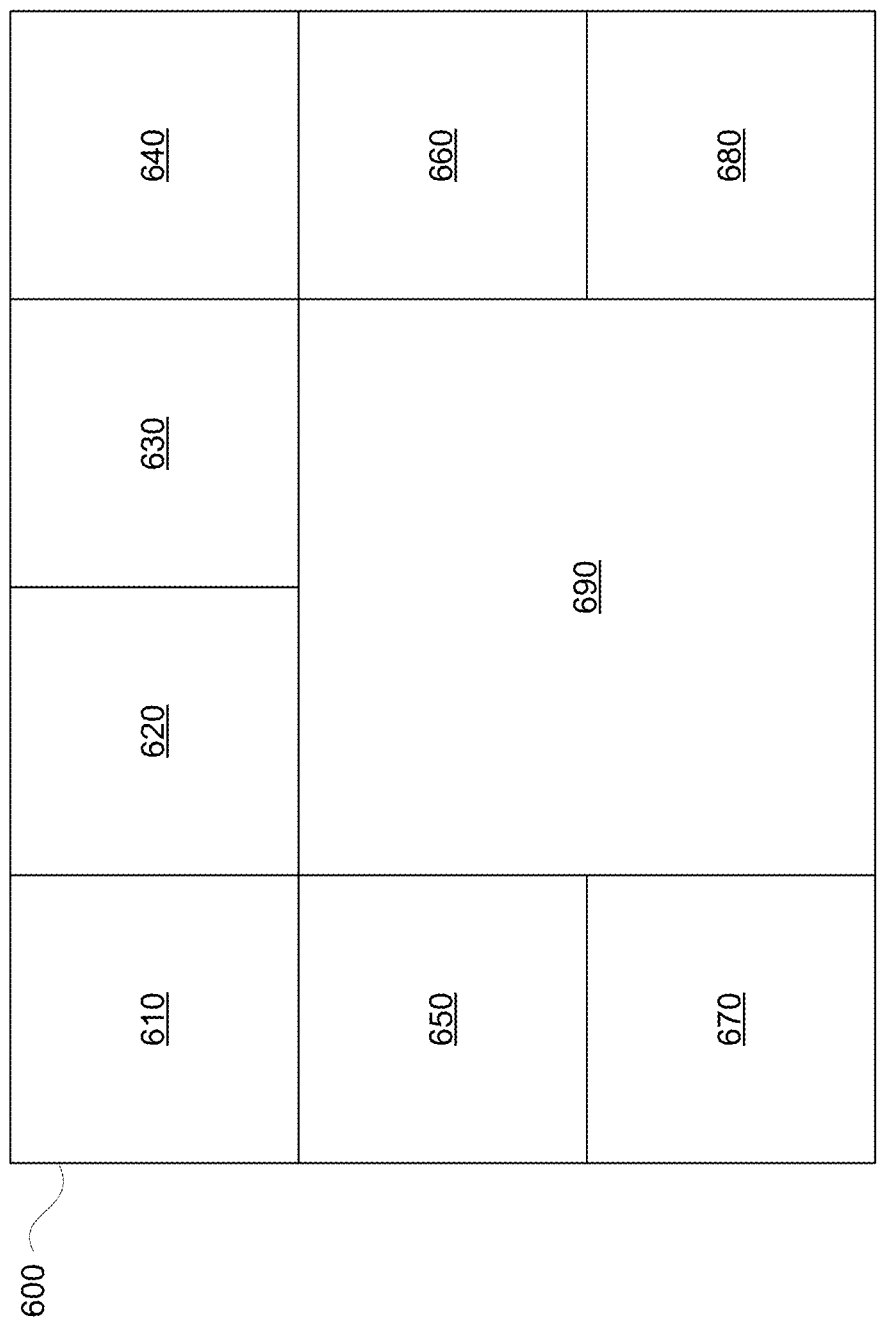
FIG. 6 is an example of map shards in accordance with aspects of the disclosure.

As noted above, the map information may be partitioned into shards. Each shard may fit with one or more adjacent shards with overlapping edges. In this regard, each node may be located in only one shard, while some edges may traverse adjacent shards. The shards themselves may be arranged as rectangles or other polygons that fit together at these overlapping edges. FIG. 6 is an example of map information 600 including a plurality of shards 610, 620, 630, 640, 650, 660, 670, 680, 690.

In addition, the geographical areas covered by each shard may be determined based on how many shards may need to be loaded at a given time into RAM memory of a vehicle. In this regard, the shards may be determined arbitrarily based on the amount of data in each area such that all shards may have approximately the same size in terms of memory requirements but different sizes in terms of geographic areas. In this regard, some shards may cover larger geographical areas than others. For example, as shown in FIG. 6, shards 610, 620, 630, 640, 650, 660, 670, 680 are physically smaller than the shard 690. In this regard, shard 690 represents a larger geographic area than the shards 610, 620, 630, 640, 650, 660, 670, 680.

Returning to FIG. 13, at block 1320, a plurality of port nodes for the selected shard are identified. Each port node has an edge that enters into the selected shard or exits the selected shard. For instance, nodes at the edges of each shard, or those which connect to an edge which leads out of or into a shard (the direction may depend upon the traffic flow for each edge), may be referred to as "port" nodes. Each port node may include an identifier which identifies another port node in another shard to which that port node is connected in the map. By doing so, the shards may be aligned with one another relatively easily. Although not depicted in FIG. 6 for clarity, each shard 610, 620, 630, 640, 650, 660, 670, 680, 690 may include a plurality of port nodes and edges, such as the nodes and edges of the map information 200 depicted in FIG. 2B, representing the drivable areas within the shards.

Figure 7:
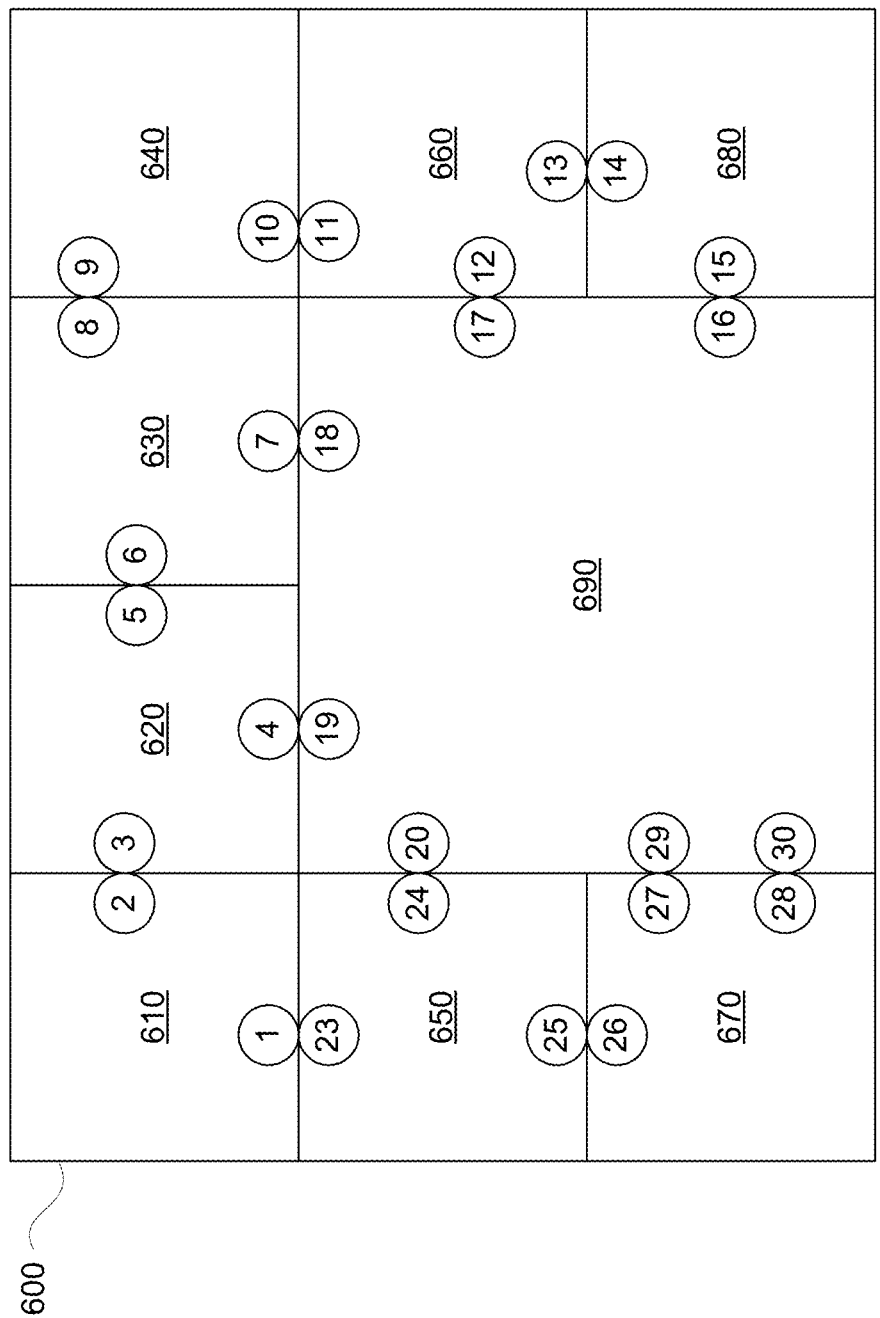
FIG. 7 is an example of port nodes and map shards in accordance with aspects of the disclosure.

FIG. 7 identifies a plurality of port nodes 1-30 for each of the shards 610, 620, 630, 640, 650, 660, 670, 680, 690. Each of these port nodes represents a node which connects to an edge which leads out of one of the shards. Although not depicted for ease of use and understanding, each of these port nodes may be associated with an identifier which identifies another port node in another shard to which that port node connects. For example port node 1 of shard 610 may be associated with an identifier for port node 23 of shard 650, port node 2 of shard 610 may be associated with an identifier for port node 3 of shard 620, port node 23 of shard 650 may be associated with an identifier for port node 1 of shard 610, port node 3 of shard 620 may be associated with an identifier for port node 2 of shard 610, and so on.

Returning to FIG. 13, at block 1330, for each port node of the plurality of port nodes having an edge that enters into the selected shard, optimal routes to each other port node of the plurality of port nodes having an edge that exits the selected shard are determined. For instance, for a given shard, an optimal route between all port nodes with edges that enter the given shard and all other port nodes with edges that exit a given shard may be determined. These optimal routes may be determined similarly to how the routing system 166 determines routes between nodes or location. In this regard, the optimal routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each optimal route may include a plurality of nodes and edges which the vehicle can use to reach the destination. The cost of that overall route as well as the optimal route itself may be associated with the shard.

Figure 8:
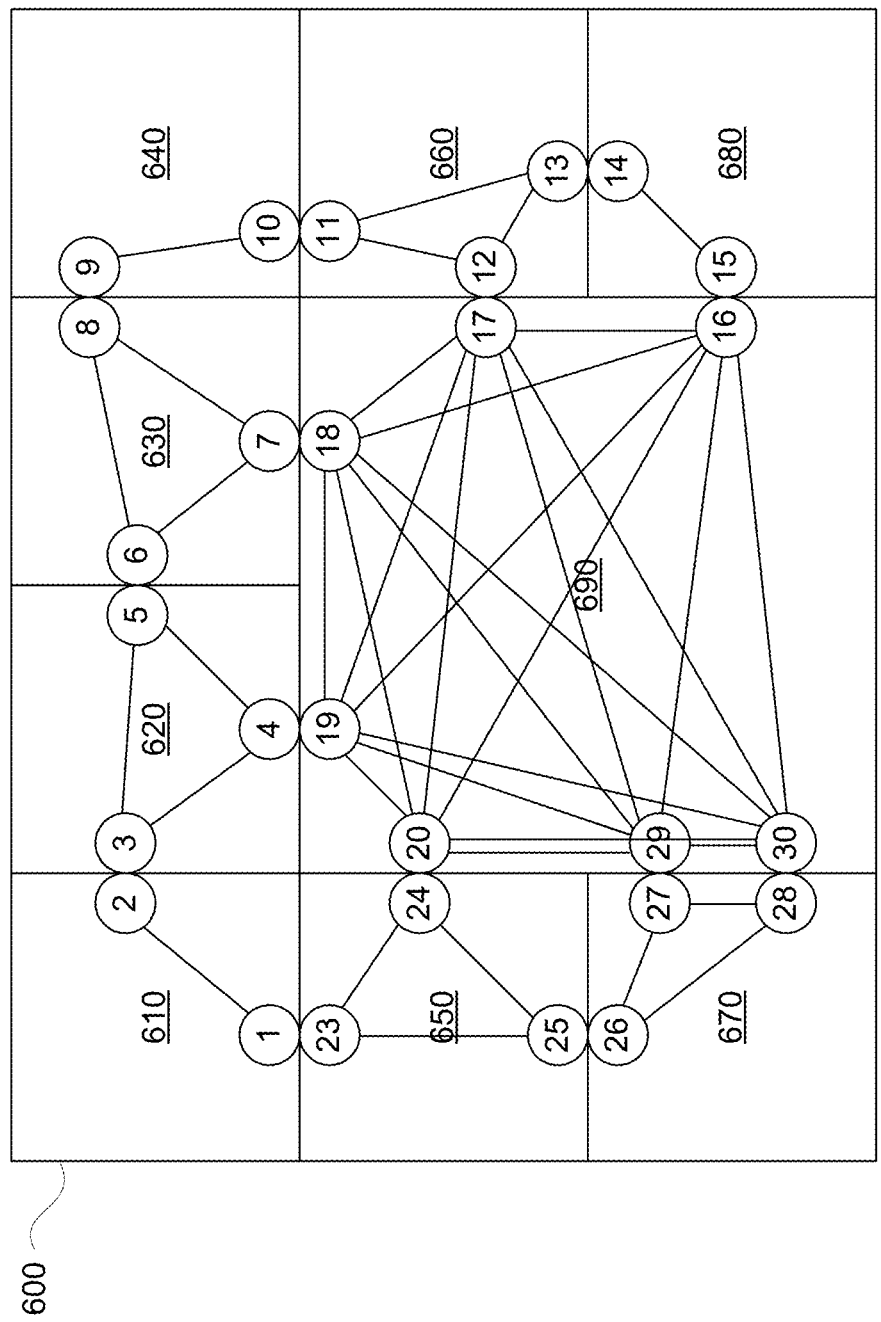
FIG. 8 is an example of optimal routes, port nodes and map shards in accordance with aspects of the disclosure.

This process may be repeated across all shards in the map. For example FIG. 8 depicts a plurality of optimal routes represented by the connective lines between port nodes within each of the shards 610, 620, 630, 640, 650, 660, 670, 680, 690. Thus, each of these optimal routes as well as the costs of each of these routes may be associated with their respective shards. For example, the optimal route between port nodes 1 and 2 as well as the cost of this route may be associated with the shard 610. Similarly, the optimal route between port nodes 3 and 4 as well as the cost of this optimal route may be associated with the shard 620, the optimal route between port nodes 4 and 5 as well as the cost of this optimal route may be associated with the shard 620, and the optimal route between port nodes 3 and 5 as well as the cost of this optimal route may be associated with the shard 620, and so on for each of the optimal routes and shards.

Returning to FIG. 13, at block 1340, the optimal routes for the selected shard are sent to the autonomous vehicles in order to enable the autonomous vehicles to use the optimal routes to determine routes. For instance, the shards (i.e. the map information of the shards) as well as associated optimal routes and costs may be sent by the server computing devices 410 to the computing devices 110 of the autonomous vehicles to be used for routing for instance via a network such as network 460.

Figure 14:
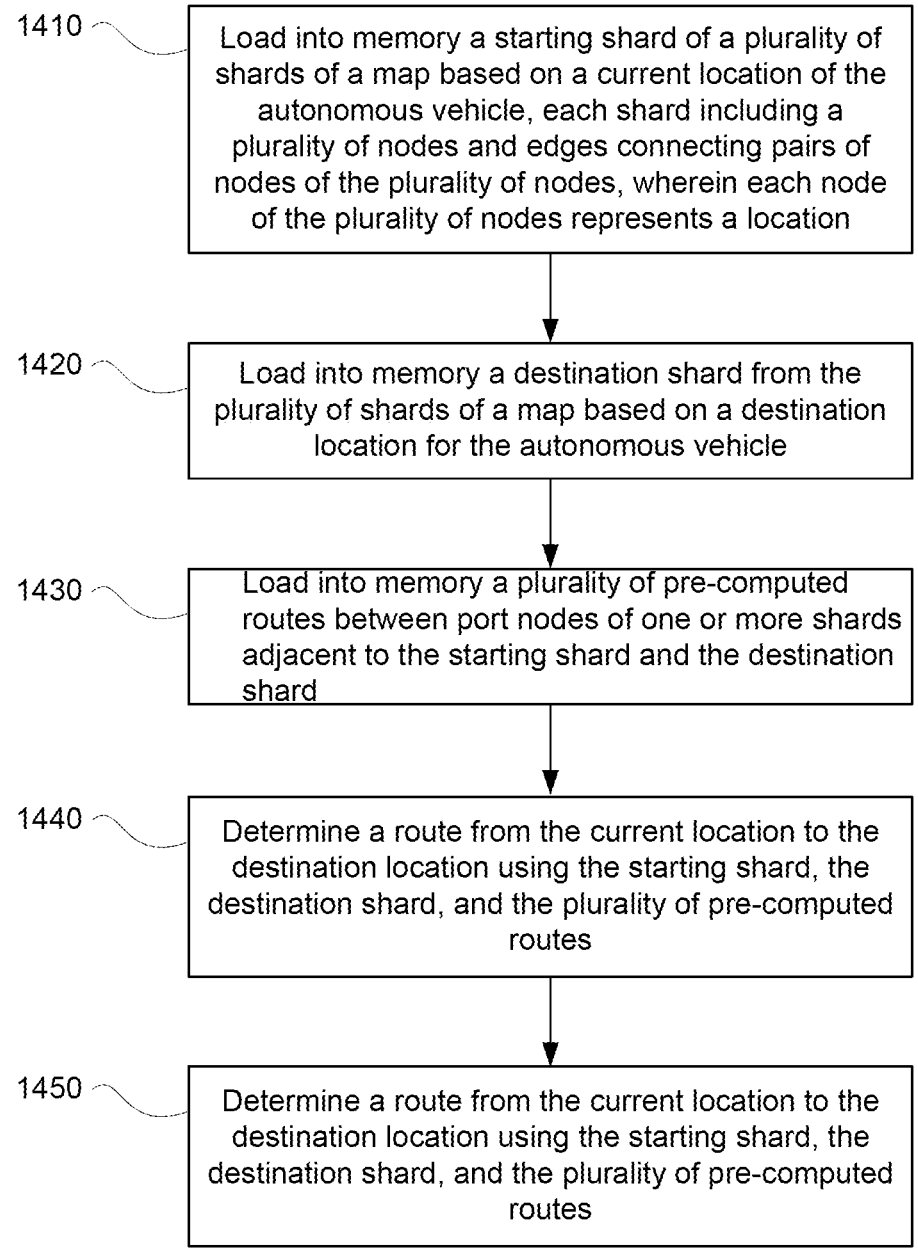
FIG. 14 is another example flow diagram in accordance with aspects of the disclosure.

FIG. 14 provides an example flow diagram 1400 for routing an autonomous vehicle which may be performed by one or more processors of one or more computing devices such as the processors 120 of computing devices 110 and/or processors of computing devices of the routing system 166. At block 1410, a starting shard of a plurality of shards of a map is loaded into memory based on a current location of the autonomous vehicle. Each shard includes a plurality of nodes and edges connecting pairs of nodes of the plurality of nodes, and each node of the plurality of nodes represents a location. At block 1420, a destination shard from the plurality of shards is loaded into the memory based on a destination location for the autonomous vehicle. At block 1430, a plurality of pre-computed routes between port nodes of one or more shards adjacent to the starting shard and the destination shard are loaded into the memory. Each port node has an edge that enters into the selected shard or exits the selected shard.

Figure 9:
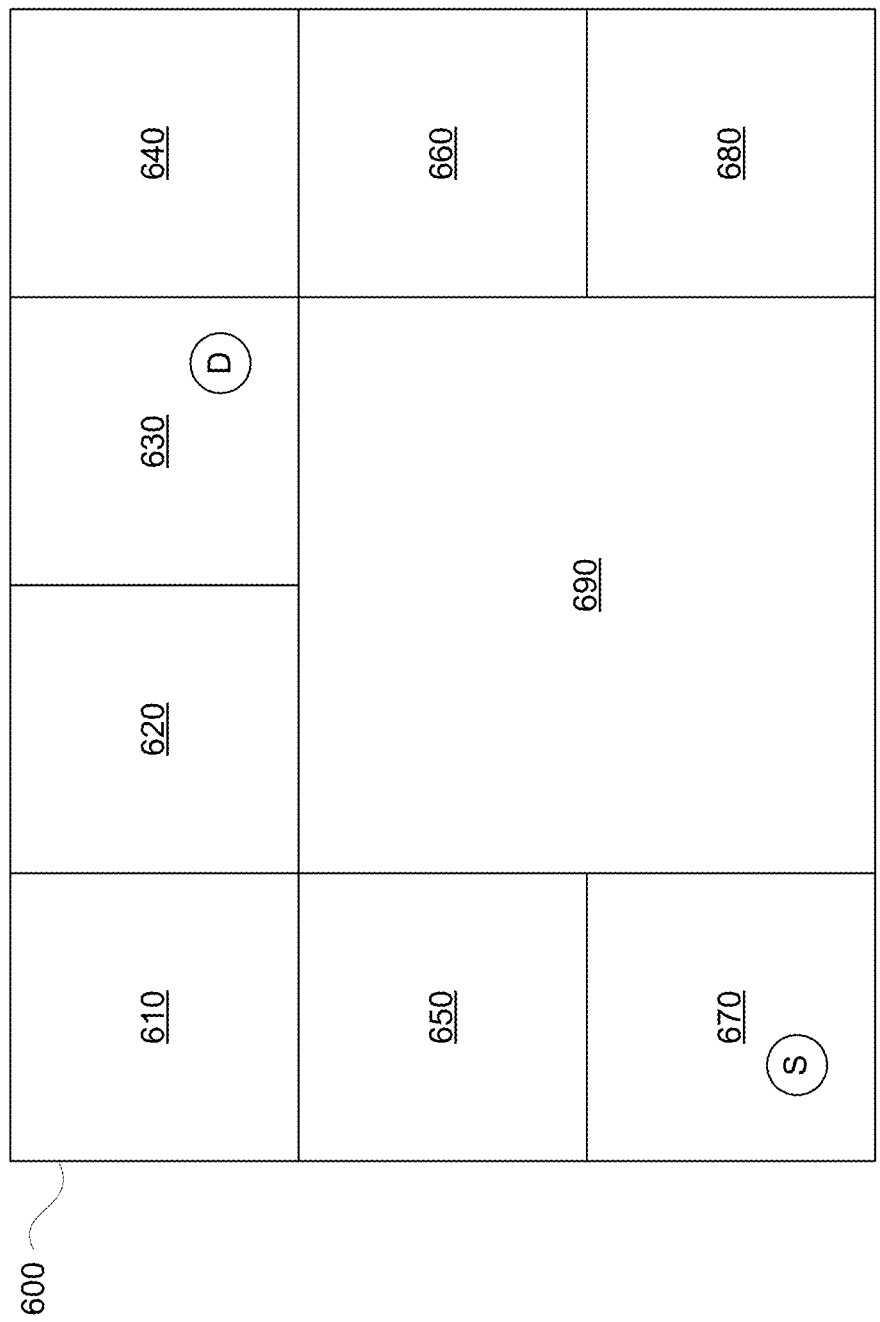
FIG. 9 is an example of a starting location node and a destination location node in accordance with aspects of the disclosure.
Figure 10:
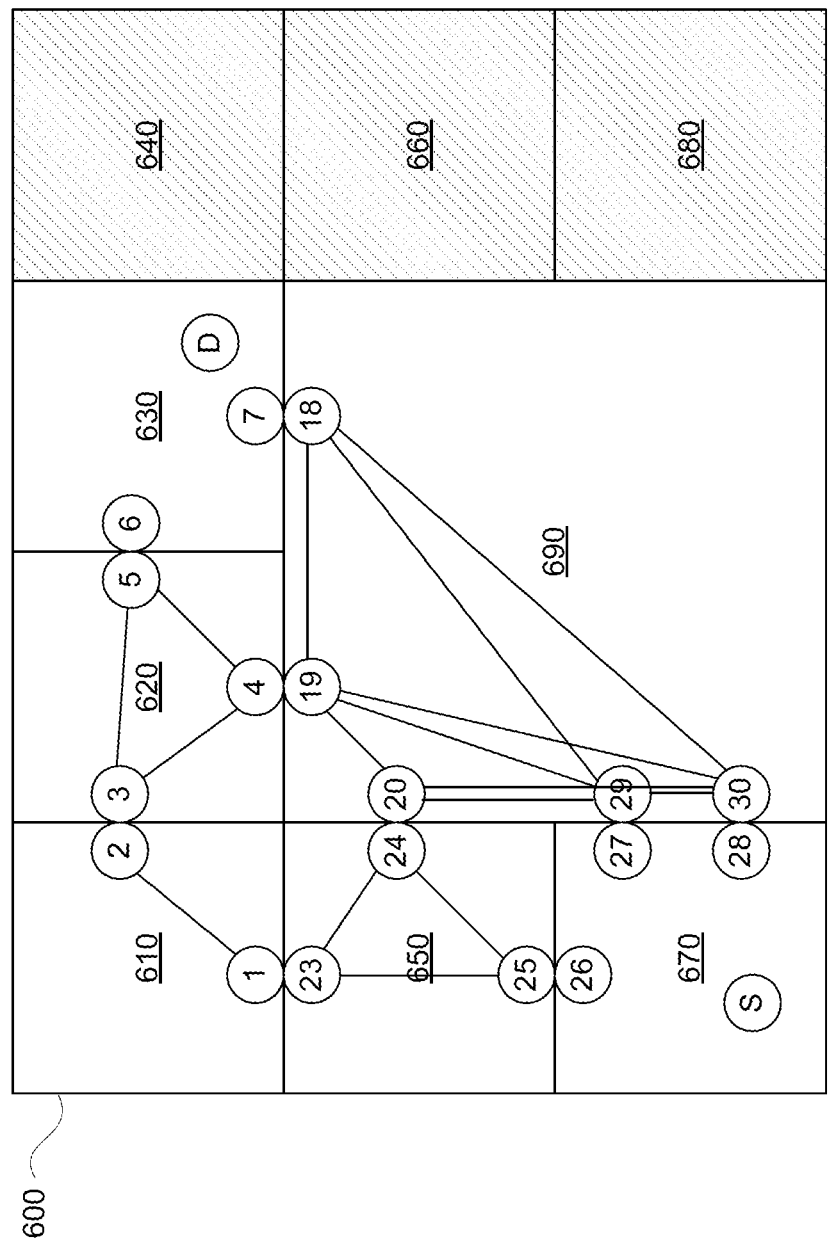
FIG. 10 is an example of a starting location node and a destination location node, optimal routes, port nodes and map shards in accordance with aspects of the disclosure.

When routing, computing devices 110 and/or the routing system 166 of an autonomous vehicle such as vehicle 100 may load a starting shard (in which the current location of the vehicle is located) and a destination shard (in which the destination is located) into RAM memory as well as the optimal routes and costs for nearby adjacent shards. For example, turning to FIG. 9, node S represents a starting location node (e.g. a current location of a vehicle) for a route in shard 670 and node D represents a destination location for a route in shard 630. In this regard, shard 670 may be a starting shard, and shard 630 may be a destination shard. Turning to FIG. 10, the computing devices 110 may load the details (i.e. all of the map information) of the shard 630 (the destination shard) and shard 670 (the starting shard) into RAM. In addition, the computing devices 110 may also load the optimal routes and costs of nearby and/or adjacent shards including 610, 620, 650, 690 into the RAM as well. Of course, these optimal routes and costs may be loaded before or during the routing or searching process and need not include all optimal routes and costs for each of the nearby and/or adjacent shards, but only those that are relevant to the routing as shown in FIG. 10. In this regard, the map information of or rather the details of the edges, nodes and other features within each nearby and/or adjacent map shard need not actually be loaded into the RAM during the routing process. In addition, shards 640, 660, 680 need not be loaded into the RAM and are thus shaded in FIG. 10.

The computing devices 110 and/or the routing system 166 may then perform typical routing searches in order to find a lowest cost route between the current location of the vehicle and the destination using the optimal routes rather than all of the nodes and edges along those optimal routes. In other words, the routing system 166 may use the shards to determine a route from a current location (e.g. a location of a current node) to a destination. For instance, the routing system may identify the shards of a current location and a destination location for a trip and pull these into RAM memory in order to generate a route.

Figure 11:
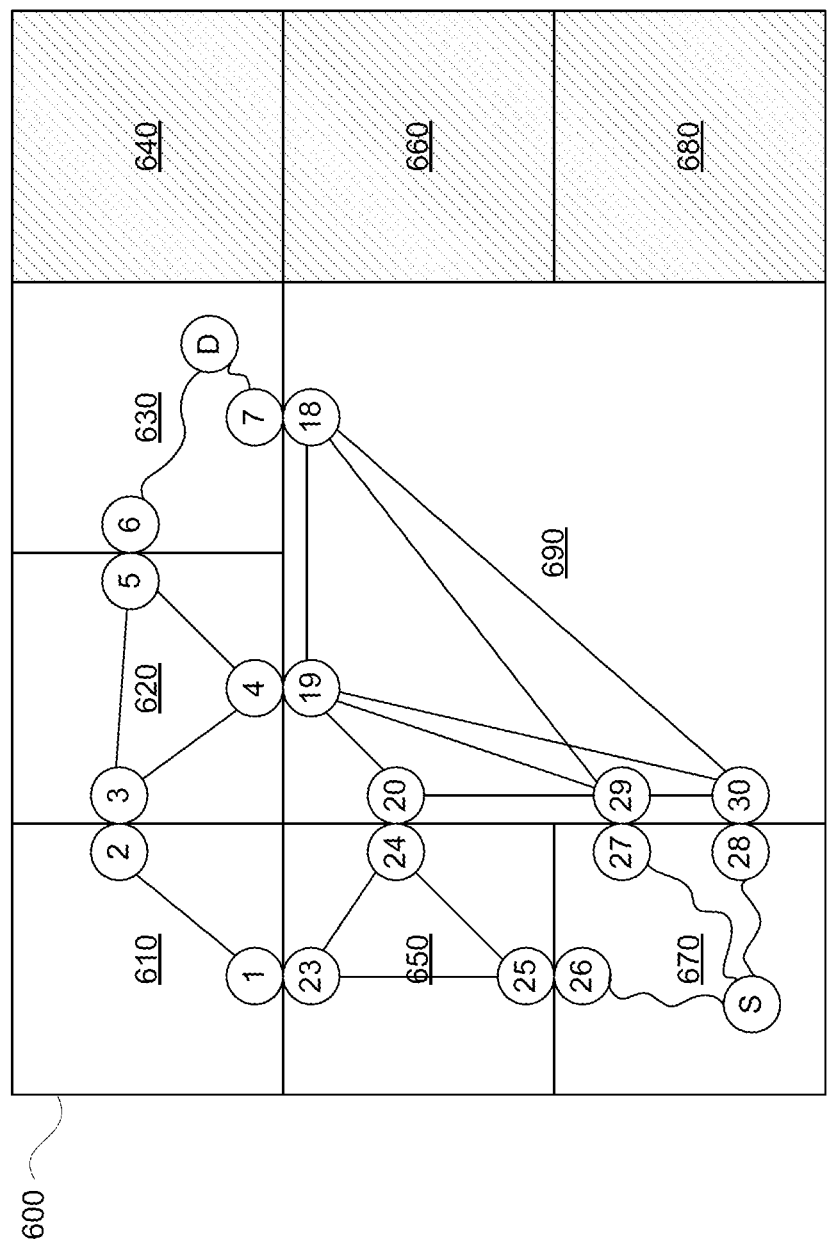
FIG. 11 is an example of a starting location node and a destination location node, routes, port nodes and map shards loaded into memory in accordance with aspects of the disclosure.
Figure 12:
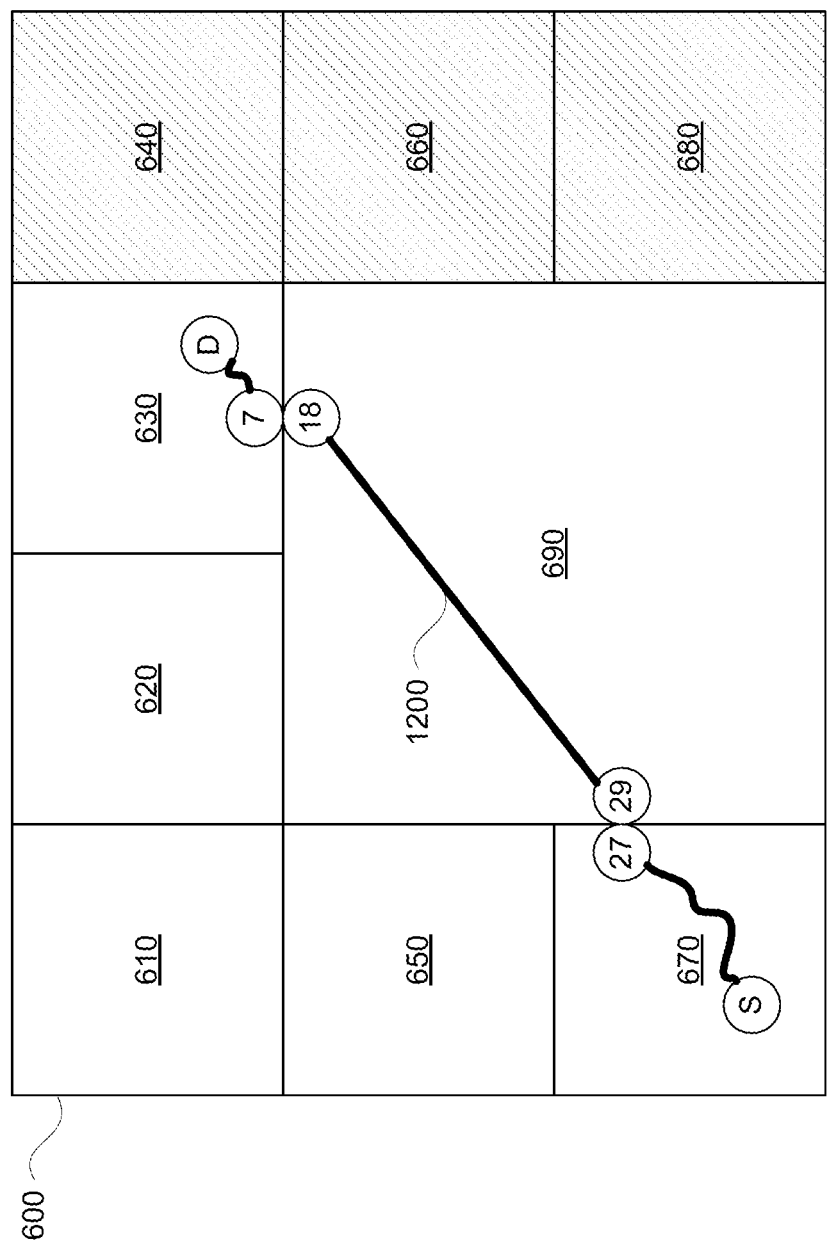
FIG. 12 is an example of a route between a starting location node and a destination location node in accordance with aspects of the disclosure.

At block 1440, a route from the current location to the destination location is determined using the starting shard, the destination shard, and the plurality of pre-computed routes. Again, routes may be generated using a cost-based analysis which attempts to select a route to the destination with a lowest cost as described above. In FIG. 11, the routing includes routing between the starting location node S and each of the port nodes within the shard 670 depicted as "squiggly lines". From these port nodes, the computing devices 110 and/or computing devices of the routing system 166 may use the optimal routes to determine possible routes between each of port nodes 26, 27, 28 of shard 670 and port nodes 6 and 7 of shard 630. The computing devices 110 and/or computing devices of the routing system 166 may also determine routes between the port nodes 6, 7 of shard 630 and the destination node D also depicted as "squiggly lines". Turning to FIG. 12, the lowest cost route 1200 between the starting node S and the destination node D may then be determined and or set as the route for the vehicle. In this example, the route 1200 starts at the starting node S and continues towards port node 27 of shard 670, passes through the port node 27 of shard 670, exits the shard 670 and enters shard 690 by passing into the shard 690 through port node 29, exits the shard 690 and enters the shard 630 by passing into the shard 630 through port node 7, and ends at the destination node D.

In this regard, the optimal routes can be used by the routing system 166 as hyper-edges that allow the routing algorithm to bypass nodes and edges within a shard if the route passes into and exits that shard. Thus rather than analyzing the entire shard, the routing system can simply process the optimal routes as individual edges between port nodes using the associated costs. In this regard, only the optimal routes and costs for a given shard need to be pulled into the RAM memory rather than the entire given shard when initially determining a route. Once the route is determined or set, the rest of a shard may be loaded immediately or as the vehicle enters that shard. For example, once the route is set, the rest of the shards along the route may be loaded immediately as a prefetch optimization as these shards will likely be traversed by the vehicle in the near future and will need to be loaded when the vehicle enters these shards. This may speed up the computation as well as reduce the amount of data required to be loaded in memory when computing routes initially because detailed information within the shard is no longer required for the computation.

At block 1450, the vehicle is controlled in an autonomous driving mode using the route. In this regard, the route may be input into the planning system 168 in order to generate trajectories for the vehicle to follow, and the vehicle may be controlled in order to follow the route as described above.

The costs for the optimal routes may change over time, for example, due to traffic conditions, appearance of construction zones, road closures, etc. In many instances, these changes may not actually have an effect on which shards the vehicle will enter, and thus, can be ignored. In other words, the optimal routes may be good enough to push a search performed by the routing system in the right direction and once within the geographic area of a shard, because the vehicle is constantly recomputing the route the vehicle may still be able to account for the changing costs and adjust from the optimal route as needed.

Of course, periodically, the optimal routes and costs may be recomputed and updated. The recomputing may occur at the backend (e.g. at the server computing devices 410), and the map information on the vehicles updated accordingly, or alternatively, the optimal routes may be updated at the vehicle locally by computing devices 110 and/or the routing system 166. An example of where the optimal routes are updated on the backend and pushed to the vehicle is if there is a major road closure, such as a freeway closure, and because the optimal routes through that shard change significantly, the server computing devices 410 may determine and push out new sets of port nodes (if the road closure relates to a port node), optimal routes and costs to the vehicles via a network such as network 460. An example of where the optimal routes are updated at the vehicle is if the vehicle's autonomous vehicle control system software detects a road closure, for instance in a current or neighboring shard, because the optimal routes through that shard may change, the computing devices 110 and/or the routing system 166 may determine new sets of port nodes (if the road closure relates to a port node), optimal routes and costs for the shard in which the closure appears. As another example, at the vehicle, optimal routes for shards which are adjacent to a shard in which the vehicle is currently traveling may be recomputed and updated periodically if there are spare CPU cycles. Alternatively, after a period of time the optimal routes and costs may be cleared away (e.g. because they have become stale), and computing devices 110 and/or the routing system 166 may wait for an update.

The optimal routes may be specialized for different vehicle types to account for differences in where they are able to drive, or where it is most convenient for them to drive. For instance, different vehicles may be capable of different types of maneuvers or only driving in certain areas. For example, newer software might have more capabilities and thus the routes for those vehicles can start taking advantage of those capabilities. As another example, for trucks which have a much wider body width that prevents them from using narrow roads and making narrow right turns, the optimal routes may seek to avoid such areas. As another example, in California, electric vehicles are allowed to use HOV lanes even if they only have one passenger. As yet another example, if an autonomous vehicle will not have a human driver, it may be subject to stricter restrictions for certain types of maneuvers (e.g. no entering shared turn lanes). Alternatively, for data collection or testing purposes, autonomous vehicles with human drivers may actively seek out areas with more complicated maneuvers. In this regard, the optimal routes and costs may also be tagged with information identifying a set of vehicles to which the optimal route applies. This may allow many different vehicle types to use the same routing data structure.

The routes may also be specialized for different transportation objectives. For instance, the routes used for transporting passengers may be different from the routes taken for delivery. For example, in delivering cargo such as groceries or packages, routes with slightly longer ETAs or more turns may be acceptable because circuitous routes are less of a problem for trips without passengers and may provide other benefits, such as avoiding traffic congestion or interactions with other vehicles.

The features described herein may provide for a useful and practical approach to accessing and using map shards for routing. As noted above, the shards or only as needed optimal routes and costs can be loaded and unloaded dynamically during the vehicle's operation. Also, by pre-computing optimal routes and costs remotely from a vehicle, this may significantly reduce computational and memory resources needed for routing across two or more shards. In addition, by having smaller shards of the map information, this allows for systems which may require less resources, such as less RAM or processing power. This, in turn, may result in lower heat generation and lower coolant needs, lower weight for autonomous vehicle control system hardware and corresponding cooling systems, lower power draw which can result in longer battery life and possibly better fuel efficiency, and lower overall costs to build the vehicle (e.g. lower cost cooling and hardware systems). Moreover, the features described herein may be especially useful for vehicles, such as trucks, which may follow routes across vast distances and/or state lines.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for controlling an autonomous vehicle, the method comprising;
accessing, by one or more processors of the autonomous vehicle, map information partitioned into a plurality of shards, wherein each shard of the plurality of shards corresponds to a geographic area and includes (1) a plurality of internal nodes, (2) edges connecting pairs of nodes of the plurality of internal nodes, and (3) a plurality of port nodes each having an edge that enters from an adjacent shard, and wherein each shard of the plurality of shards is associated with a plurality of pre-computed routes between port nodes of that shard;
loading, by one or more processors, into a random access memory, a starting shard of the plurality of shards based on a current location of the autonomous vehicle such that the current location is within the geographic area of the starting shard;
loading, by the one or more processors, into the random access memory, a destination shard of the plurality of shards based on a destination location for the autonomous vehicle, such that the destination location is within the geographic area of the destination shard;
identifying, by the one or more processors, at least one shard adjacent to the starting shard or the destination shard, the at least one shard having a port node associated with an edge that (1) exits the starting shard or (2) enters the destination shard;
loading, by the one or more processors, into the random access memory, the plurality of pre-computed routes associated with the at least one shard without loading all of the plurality of internal nodes of the at least one shard into the random access memory;
determining, by the one or more processors, a route from the current location to the destination location using ones of the plurality of internal nodes and edges of the starting shard, ones of the plurality of internal nodes and edges of the destination shard, and at least one of the plurality of pre-computed routes associated with the at least one shard from the random access memory; and
controlling, by the one or more processors, the autonomous vehicle in an autonomous driving mode using the determined route.

2. The method of claim 1, wherein each node of the map information appears in only one shard.

3. The method of claim 1, wherein each of the plurality of pre computing routes is associated with a cost for following that pre-computed route, and determining the route is further based on the costs of the plurality of pre-computed routes.

4. The method of claim 1, wherein determining the route using the plurality of pre-computed routes includes treating the pre-computed routes as individual edges between a pair of port nodes.

5. The method of claim 1, wherein each of the plurality of pre-computed routes is associated with a type of vehicle to which the route applies, and wherein the method includes selecting ones of the plurality of pre-computed routes associated with a type of vehicle which is a same type of vehicle as the autonomous vehicle, and wherein determining the route is further based on the selected ones.

6. The method of claim 1, wherein each geographic area of each shard of the plurality of shards covers a differently sized geographic area.

7. The method of claim 1, wherein each shard of the plurality of shards are approximately a same size in terms of memory requirements.

8. The method of claim 1, further comprising:
receiving, from a remote computing device, an updated plurality of routes for the at least one shard:
determining an updated route from an updated current location to the destination location based on the starting shard, the destination shard, and at least one of the updated plurality of routes; and
controlling the autonomous vehicle in the autonomous driving mode using the updated determined route.

9. The method of claim 8, further comprising, receiving an updated cost for each of the plurality of updated routes, and wherein determining the updated route is further based on the updated costs.

10. The method of claim 1, further comprising:
determining an updated plurality of routes for the at least one shard;
determining an updated route from an updated current location to the destination location based on the starting shard, the destination shard, and at least one of the updated plurality of routes; and
controlling the autonomous vehicle in the autonomous driving mode using the updated determined route.

11. A system for controlling an autonomous vehicle, the system comprising;
first memory storing map information partitioned into a plurality of shards, wherein each shard of the plurality of shards corresponds to a geographic area and includes (1) a plurality of internal nodes, (2) edges connecting pairs of nodes of the plurality of internal nodes, and (3)

a plurality of port nodes each having an edge that enters from an adjacent shard, and wherein each shard of the plurality of shards is associated with a plurality of pre-computed routes between port nodes of that shard;
a random access memory;
one or more processors configured to:
   load into the random access memory, a starting shard of the plurality of shards based on a current location of the autonomous vehicle such that the current location is within the geographic area of the starting shard;
   load into the random access memory, a destination shard of the plurality of shards based on a destination location for the autonomous vehicle, such that the destination location is within the geographic area of the destination shard;
   identify at least one shard adjacent to the starting shard or the destination shard, the at least one shard having a port node associated with an edge that (1) exits the starting shard or (2) enters the destination shard;
   load into the random access memory, the plurality of pre-computed routes associated with the at least one shard without loading the at least one shard into the random access memory;
   determine a route from the current location to the destination location using ones of the plurality of internal nodes and edges of the starting shard, ones of the plurality of internal nodes and edges of the destination shard, and at least one of the plurality of pre-computed routes associated with the at least one shard from the random access memory; and
   control the autonomous vehicle in an autonomous driving mode using the determined route.

12. The system of claim 11, wherein each node of the map information appears in only one shard.

13. The system of claim 11, wherein each of the plurality of pre-computing routes is associated with a cost for following that pre-computed route, and the one or more processors are further configured to determine the route further based on the costs of the plurality of pre-computed routes.

14. The system of claim 11, wherein he one or more processors are further configured to determine the route using the plurality of pre-computed routes by treating the pre-computed routes as individual edges between a pair of port nodes.

15. The system of claim 11, wherein each of the plurality of pre-computed routes is associated with a type of vehicle to which the route applies, and wherein the one or more processors are further configured to select ones of the plurality of pre-computed routes associated with a type of vehicle which is a same type of vehicle as the autonomous vehicle, and to determining the route further based on the selected ones.

16. The system of claim 11, wherein each geographic area of each shard of the plurality of shards covers a differently sized geographic area.

17. The system of claim 11, wherein each shard of the plurality of shards are approximately a same size in terms of memory requirements.

18. The system of claim 11, the one or more processors are further configured to:
   receive, from a remote computing device, an updated plurality of routes for the at least one shard;
   determine an updated route from an updated current location to the destination location based on the starting shard, the destination shard, and, at least one of the updated plurality of routes; and
   control the autonomous vehicle in the autonomous driving mode using the updated determined route.

19. The system of claim 18, the one or more processors are further configured to receive an updated cost for each of the plurality of updated routes, and to determine the updated route further based on the updated costs.

20. The system of claim 11, the one or more processors are further configured to:
   determine an updated plurality of routes for the at least one shard;
   determine an updated route from an updated current location to the destination location based on the starting shard, the destination shard, and at least one of the updated plurality of routes; and
   control the autonomous vehicle in the autonomous driving mode using the updated determined route.

* * * * *